United States Patent
Woods et al.

[11] Patent Number: 5,337,180
[45] Date of Patent: Aug. 9, 1994

[54] OPTICAL SIGNAL DEPENDENT NOISE REDUCTION BY VARIABLE SPATIAL THRESHOLDING OF THE FOURIER TRANSFORM

[75] Inventors: Charles L. Woods, Stow, Mass.; Jihad Khoury, Arlington, Va.

[73] Assignee: The United States of America as represented by the Secretary of the Air Force, Washington, D.C.

[21] Appl. No.: 921,542

[22] Filed: Jul. 29, 1992

[51] Int. Cl.⁵ .................... G02B 27/46; G02B 5/23
[52] U.S. Cl. ........................ 359/568; 359/299; 359/559
[58] Field of Search .......... 359/299, 559, 568; 364/726; 358/166, 167, 463

[56] References Cited

U.S. PATENT DOCUMENTS

| | | | |
|---|---|---|---|
| 4,715,689 | 12/1987 | O'Meara et al. | 359/568 |
| 4,720,176 | 1/1988 | Klein et al. | 359/568 |
| 4,974,920 | 12/1990 | Chovan et al. | 359/559 |
| 5,072,314 | 12/1991 | Chang | 359/559 |

OTHER PUBLICATIONS

Khoury et al.; Jul. 29, 1991 OSA Photonic Science Topical Mtg. Series, vol. 14, AD-A253001, pp. 182–185; Abst. only provided.
Khoury et al.; Opt. Lett., vol. 16, #10, pp. 749–799, May 15, 1991; Abst. only provided.
Khoury et al.; Opt. Commun., vol. 82, No. 5-6, pp. 533–538, May 1, 1991; abst. only supplied.
Li et al.; Opt. Commun. vol. 76, #1, pp. 13–20, Apr. 1, 1990; abst. only supplied.

*Primary Examiner*—Nelson Moskowitz
*Attorney, Agent, or Firm*—Donald J. Singer; Robert L. Nathans

[57] ABSTRACT

Spatially variable nonlinear optical thresholding in the Fourier plane reduces signal-dependent noise, such as scalar multiplicative noise. Coherent artifact noise reduction by a factor of four is attained using deamplifying photorefractive two-beam coupling. A variable light transmittance threshold across a spatially thresholded light modulating element such as a photorefractive crystal is utilized for this purpose.

19 Claims, 2 Drawing Sheets

OPTICAL SIGNAL DEPENDENT NOISE REDUCTION BY VARIABLE SPATIAL THRESHOLDING OF THE FOURIER TRANSFORM

BACKGROUND OF THE INVENTION

The present invention relates to the field of processing optical signals.

Many optical image processing operations such as edge enhancement may be performed by suitable linear spatial filters. A broader class of operations is made available by extending this technique to nonlinear filtering. An example of this is the use of logarithmic nonlinearities for signal compression or conversion of multiplicative to additive noise. In accordance with the present invention, we demonstrate the use of phase preserving thresholding (with the linear transmission of high intensities) in the Fourier plane for reducing additive signal dependent noise, such as coherent artifact noise, image defects and spatial light modulator nonuniformity.

Additive signal dependent noise is much more difficult to reduce than independent additive noise. Coherent artifact noise, uniformity noise, defect noise and film grain noise may produce important limitations in the operation of coherent optical processing devices. It has been shown that each of these noise sources contributes similarly in the Fourier transform plane by adding a signal dependent noise component to the signal transform. If this added noise transform term is weak relative to the signal transform, a nonlinear optical thresholding mechanism operating in the Fourier plane will separate the relatively intense signal peaks by attenuating the noise between the signal peaks. This noise reduction often works with input amplitudes which have a small signal relative to noise. We used the thresholding mechanism of photorefractive two-beam coupling to reduce strong artifact or defect noise in plane wave illumination of a bar chart transparency. There is no noticeable reduction in the resolution of the signal used in our measurements. Furthermore, no clean signal pattern is used as a reference signal in this noise reduction technique.

BRIEF SUMMARY OF AN EMBODIMENT OF THE INVENTION

The present invention is an extension of our previous work which used a constant transmission threshold to reduce additive speckle noise. See J. Khoury et al., Optics Letters, Vol. 16, No. 10, May 15, 1991. Additive noise is independent of the signal and therefore relatively easy to reduce in comparison with signal dependent noise which is notoriously difficult to reduce. In accordance with the present invention, a spatially variable threshold is used in the Fourier plane to reduce additive signal dependent noise. If the noise is predominantly low frequency, the noise will have an envelope similar to that of the signal spectrum. It is often possible to approximate the radial distribution of the signal by a 1/f spectrum (or some other suitable generic shape) for use in the Fourier plane thresholding. In the nonlinear optical process of two-beam coupling, it is possible to shape a reference or pump beam to spatially tune this optical threshold. In addition, a more complicated shape for this spatial threshold may be selected if sufficient information is known about the signal and/or noise.

This noise reduction technique may be used for noise reduction, signal thresholding, feedback stabilization and coherent restoration of signals in such optical processing devices as spatial light modulators, optical correlators, optical peak detectors, optical associative memories, and optical feedback systems. This approach reduces signal dependent noise such as that produced by defects and imperfections in optical components. This technique should find application in pattern recognition systems, target trackers, target designators, and image processing systems.

BRIEF DESCRIPTION OF THE DRAWINGS

Other objects, features and advantages of the present invention will become apparent upon study of the following description, taken in conjunction with the drawings in which.

DETAILED DESCRIPTION

If the input, i, consists of an amplitude modulated plane wave signal, s, accompanied by additive signal dependent noise, n(s) with a broadened power spectrum, the amplitude of the noisy image may be represented by $$i(x_1) = As + n(s) \tag{1}$$

where the multiplicative factor, A, allows a conversion of energy from signal to noise, where $A = 1 - \alpha$ produces an equal or lesser energy of noise. The Fourier transform of the amplitude modulation of the signal s(x) will be sharply peaked and reduced in amplitude, while that of n(s) will in general be weak and dispersed. In particular, the noise for coherent artifact noise, sensor noise, channel noise, grain noise, defect noise and input uniformity noise is linearly dependent on the signal, and may be represented by $$i = As + s \cdot n(x_1) \tag{2}$$

where A is approximately unity, and the noise term n(x) is a zero mean fluctuation for coherent artifact noise. For example, opaque defects in the input plane, will produce an input term of, $$i = (1-\alpha)s + (\alpha - d(x_1)) s \tag{3}$$

where the defect distribution d(x) has a value of 1 over the area of the defects and 0 elsewhere, and the constant $\alpha$ is chosen to give $(\alpha - d)$ a mean value of zero so that the factor $1 - \alpha$ accounts for the loss signal energy. Uniformity, channel and grain noise produced in the input plane may also be represented by Equation 2 in a similar manner.

Figure 2:
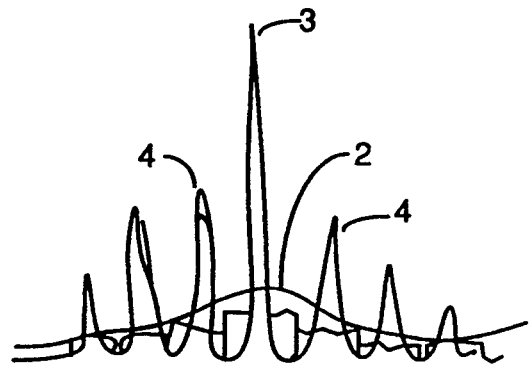
FIGS. 2 and 3 illustrate suitable transmittance thresholds used to attenuate the additive signal dependent noise in signals having low frequency noise and high frequency noise respectively.
Figure 3:
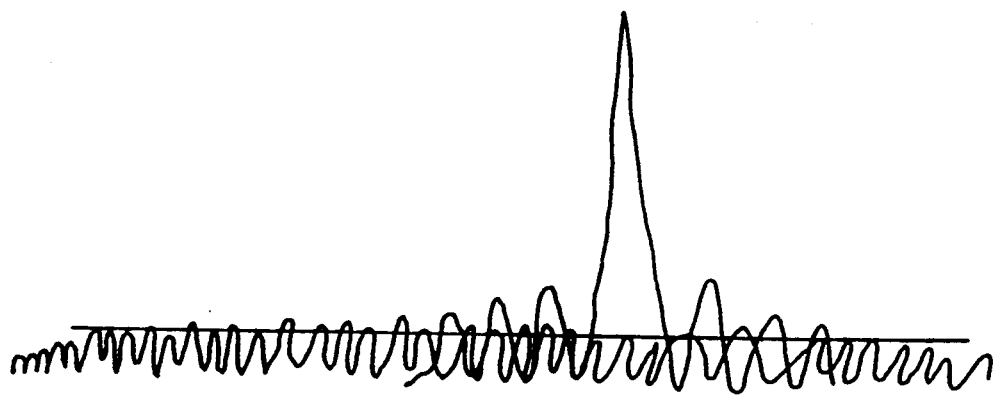

The Fourier transform of the input given by (2) is, $$I(x_2) = A\, S + N * S \tag{4}$$

where the coefficient A includes any zero-frequency component of the noise spectrum, and zero-mean noise spectrum N is the Fourier transform of the noise and has no DC term. The noise dependent term (the convolution of the noise and signal spectrums) acts to statistically distribute energy around the sharp peaks of the signal transform, as indicated in FIG. 2. For very low frequency amplitude and/or phase noise, the shape of the convolution of S and N is similar to that of the signal spectrum. However, for white noise, the shape of this convolution is flat, and only the low frequency portions of the signal spectrum rise above the noise as indicated in FIG. 3.

This noise term cannot simply be removed by band (high or low) pass spatial filtering without significantly changing the image. However, nonlinear filtering acts adaptively to reduce noise while preserving the image.

In the Fourier plane, the noise term distributed about the peaks in the signal spectrum is generally much less intense than the respective spectrum peaks of the signal. This enables the thresholding mechanism in the Fourier transform plane to reduce this noise. In two beam coupling with signal deamplification, the reference beam intensity profile $I_R(x_2)$ selects the threshold level. The asymptotes of the two beam coupling filter transmittance, $F(x_2)$, are given by $$F(x_2) = \begin{matrix} 1, \text{ for } I > I_R \\ e^{-g}, \text{ for } I < I_R \end{matrix} \quad (5)$$

where g, the deamplification coefficient, is positive. In summary, a Fourier intensity which is much greater than the reference is transmitted, and one much smaller than the references is attenuated.

If the filter is to remove the noise from the signal according to Equation 5, the spatial profile of the reference beam must satisfy the inequality $$|A|^2 > \frac{\langle I_R \rangle}{\langle |S|^2 \rangle} > \frac{\langle |S*N|^2 \rangle}{\langle |S|^2 \rangle} \quad (6)$$

where the Fourier transform of noise is characteristically broad and weak. In Equation 6, the left inequality is required to preserve the signal fidelity, and the right inequality is required to reduce the noise.

The selection of the spatial variation of the threshold is determined by Equation 6, and may contain detailed structure when the signal and/or noise are well known. It is however possible to use smoothly varying spatial thresholds to reduce signal dependent noise.

If the noise spectrum is widely spread relative to the sharp signal spectrum peaks, substantial noise reduction may be achieved with a uniform reference. For example, reduction of weak white scalar-multiplicative noise requires a flat reference for agreement with the right side of the inequality in Equation 6. High levels of white noise may reduce high frequency resolution during the noise reduction processing.

If the envelope of the noise spectrum is narrower than that of the signal, the reference beam intensity profile 2 of FIG. 2, is chosen to be approximately proportional to the signal intensity envelope. The signal spectrum amplitude often has a 1/f envelope, providing a generic best-shape for the reference profile. This can be attained by the use of a spatially variable density filter (SVDF) positioned in the path of the reference beam, as described below.

In many cases, both the signal and the noise approximately have a 1/f envelope. In addition, the noise often has a uniformly decreasing power spectrum, while the signal power spectrum may include strong separated peaks 3 and 4 as indicated in FIG. 2. As described in Equation 4, the strong signal peaks are reduced in amplitude and have an added noise term of the convolution of the noise with the peak (appearing as a surrounding, weak cloud). A reference beam intensity gradient shaped to approximately match the spectra of both the signal and noise (here approximately 1/f) provides an optimum noise reduction.

Figure 1:
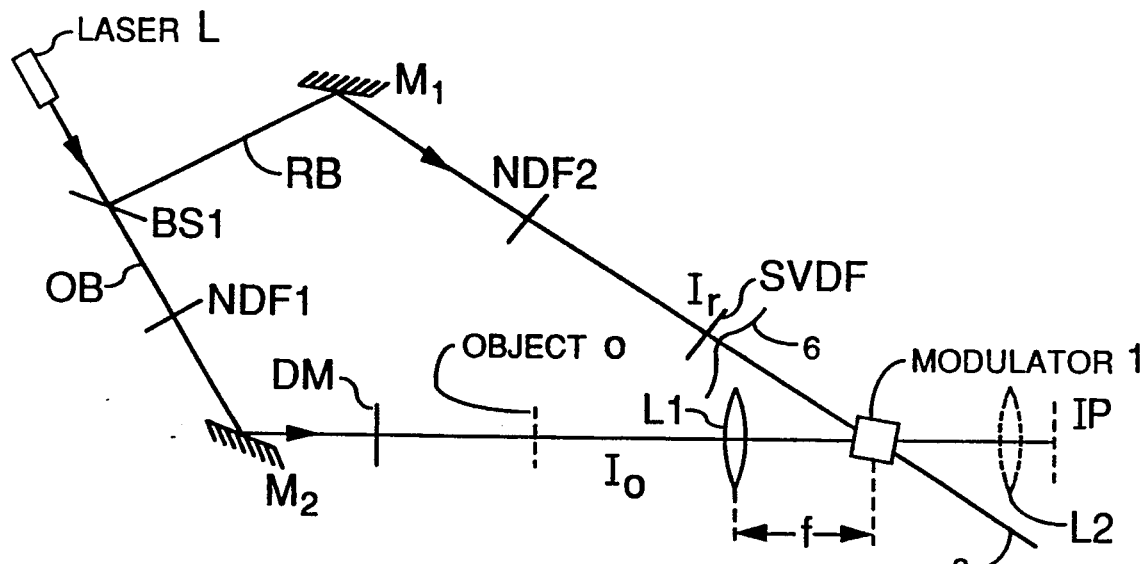
FIG. 1 illustrates an embodiment of the invention.

FIG. 1 shows our experimental implementation of two-beam coupling for signal-dependent noise reduction, employing photorefractive deamplification. The argon laser L, operates with an intercavity etalon at 514.5 nm wavelength. A beamsplitter BS1 produced an object beam OB and reference beam RB. Neutral density filters NDF1 and NDF2 were used to adjust the intensity of each beam, and the noise was generated by passing the object beam through a microscope slide DM which was lightly covered with chalk dust before illuminating the object O which was an Air Force lens resolution chart. Dust noise is generated when the slide is at the chart, and artifact noise is generated by moving the slide away from the chart. Both beams had the same diameter.

The resulting noisy optical signal was then Fourier transformed by lens L1 of 10 cm focal length into a photorefractive nonlinear threshold element 1 consisting of a barium titanate crystal of width 4.2, height 4.6, and length 4.9 mm. Lens L1 is positioned one focal length away from thresholded modulator element 1 so that it functions a Fourier transform means for the noisy optical signal. Also, the image plane IP is positioned an image distance I from L1 found by solving the well known thin lens equation $1/f = 1/O + 1/I$, where O is the distance from L1 to the object O and f is the focal plane of lens L1. As the image of object O is recovered at the image plane IP, lens L1 also advantageously functions to inverse Fourier transform the power spectrum in threshold element 1 without the need for a second Fourier transform lens. Of course such a conventional second lens L2 shown by dashed lines can be employed if desired.

The aforesaid Fourier plane thresholding can be carried out by placing a spatially variable density filter SVDF, which produces the desired beam intensity profile across the face of the photorefractive crystal thresholded modulator element 1, thereby to produce the varied threshold 2 indicated in FIG. 2. The SVDF thus functions as a threshold control means for establishing a variable transmittance threshold across the photorefractive crystal 1 which becomes a thresholded nonlinear light modulator element which attenuates a substantial portion of the additive signal dependent noise of the optical signal being processed without adversely affecting its resolution. Where the desired threshold has a shape shown in FIG. 2, the SVDF would have high transmittance (low density) at its center and lower and lower transmittances (higher and higher densities) along radial lines extending to outer portions of the filter. This is schematically indicated by the bell shaped light transmittance curve 2 of FIG. 2.

Employing the apparatus of FIG. 1, we produced photographs of the image plane IP which verify our low frequency artifact noise reduction. The artifact noise was chosen to have a spatial variation of the same order of magnitude as the width of the bar chart.

Results of our experiment using two-beam coupling deamplification thresholding with the apparatus of FIG. 1, indicated the reduction of low-frequency coherent artifact noise. A noise reduced image was produced at IP after nonlinear spatial filtering. Noise is discarded into beam 8. The grating developed in the crystal 1 works as an adaptive noise cancelling hologram. We demonstrated that the noise cancelling hologram was produced in the output IP plane when the object beam was blocked before hitting the barium titanate element 1, allowing the reference beam to reconstruct its noise cancelling hologram. Clearly only the noise has been cancelled. Using conventional high-pass spatial filtering to reduce this noise would remove the low signal frequencies with their associated noise, and the output would be edge enhanced with no improvement in the SNR. Using a spatial filter implementation of a Wiener filter increases the SNR by reducing the transmission of spectral energy in the regions where noise dominates over signal. Neither the high-pass spatial filter nor the Wiener filter produces a noise cancelled image with the fidelity of the noise cancelling hologram from two beam coupling deamplification. Equation 4 shows that the Fourier transform consists of the sum of a signal and a convolution of signal with noise. Since the noise is low frequency, a high pass filter still allows the same ratio of noise to signal to pass through to the output plane.

Figure 4A:
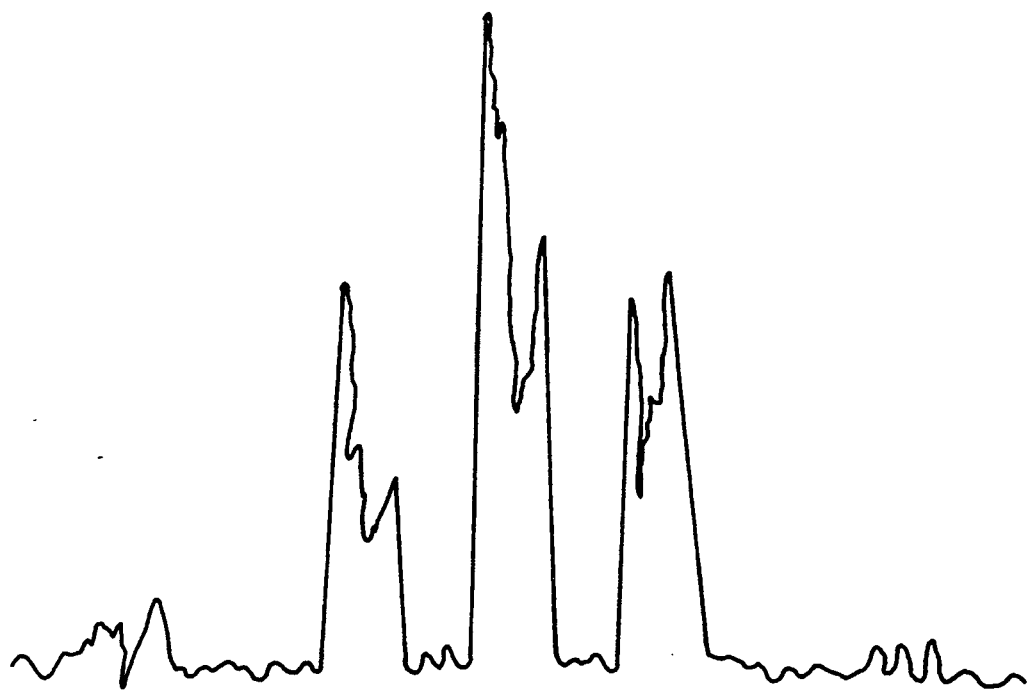
FIG. 4a shows the amplitude determined SNR before noise reduction and FIG. 4b shows the increased SNR after noise reduction in accordance with the invention.
Figure 4B:
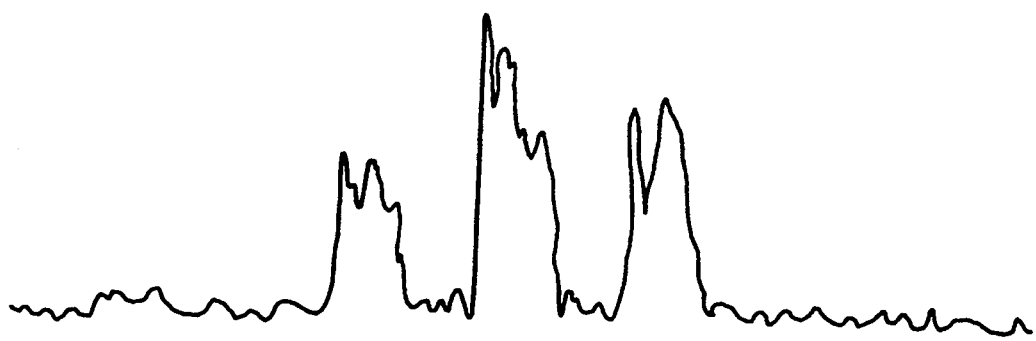

Two beam coupling deamplification thresholding reduces artifact noise as shown in FIG. 4. As shown in FIG. 4a, the input signal to noise ratio (SNR) before noise reduction was SNRi =4, and the value after noise reduction shown in FIG. 4b was increased to SNRr=15. This is an improvement in the SNR of a factor of 4. The accompanying intensity reduction in the signal in this processing was small (a signal transmission of 0.6) while the noise was substantially reduced (a noise transmission of 0.15). This is similar to that reported for additive speckle noise removal, and yields similarly high optical efficiencies while producing only a small change in the signal beam path.

The high spatial frequencies produced by point-like uniformity noise such as opaque defect (dust) or shot (channel error or drop out) noise uniformly distributed over the input plane produces a speckle-like white noise spectrum which is similar to that treated by additive speckle noise reduction; see our aforesaid prior "Optics Letters" paper. To illustrate this example, we used deamplifying two beam coupling to remove multiplicative opaque defect noise produced by dusty images. The multiplicative opaque dust produces speckle whose grain shape is determined by the input signal. This speckle is spread over 25 times the spread of the three-bar chart spectral roll-off as determined by the relative size of the dust and chart.

This technique of dust-noise (high frequencies from point sources) cleanup using two-beam coupling deamplification has been used to demonstrate beam cleanup of multiplicative scalar amplitude noise with results similar to those of artifact noise already discussed. Essentially a self-adaptive spatial filter is produced using holographic noise cancellation. Using linear low pass spatial filtering to remove this noise would have degraded the bar edges and corners of images of object O. In our experiments, the artifact noise is produced by scattering from the same dusty slide in the upstream coherent beam and consequently consists of additive low frequency patterns which are individually coherent across the input plane.

In summary, in accordance with the invention, we have demonstrated reducing signal dependent or scalar-multiplicative noise by operating on its Fourier transform consisting of a sum of the signal spectrum and the signal dependent noise, as shown in Equation 3. This technique is based solely on the difference between the coherence properties of the signal and noise and is performed without access to a reference signal. Our technique possesses good energy efficiency while preserving the features of the signal. The processing of the apparatus of FIG. 1, operates as a transmissive device without deflecting off of the optical axis, and the response time for this signal dependent noise reduction depends solely on the two-beam coupling response time which in the FIG. 1 embodiment is the photorefractive response time. If other nonlinear optical or optical storage means devices were used, they would have their own individual response times. The loss of signal resolution with this technique is very low. These results show that it is possible to reduce additive signal dependent noise without significantly affecting the resolution of the object by using two-beam deamplification for nonlinear optical thresholding. This reduction of 1/f noise is complementary to the process of zero-mean white noise reduction. We have shown that adaptive thresholding in the Fourier transform plane can reduce signal dependent additive noise produced by various input nonuniformities. This active technique works independently of the frequencies of the noise, preserves image edges, and is superior to any linear operations in these respects.

Since other embodiments of the present invention will become apparent to the skilled worker in the art, the scope of the invention is to be defined by the terms of the following claims and art recognized equivalents thereof. For example, the thresholded modulator 1 could comprise an optically or electrically addressed spatial light modulator, or other optical storage means, operating in the light reflection mode as well as the light transmissive mode shown in FIG. 1. In like manner, the method of the invention may be employed using electronic digital signal processing techniques in place of an optical processing implementation.

We claim:

1. In a two-beam coupling apparatus for processing an optical signal that reduces additive signal dependent noise associated therewith without substantially affecting the resolution of the optical signal comprising:
  (a) a spatially thresholded light modulating element;
  (b) Fourier transform means for projecting a Fourier transform of both said optical signal and signal dependent noise upon the thresholded light modulating element;
  (c) threshold control means having a substantially bell shaped transmittance over lines extending from substantially its center point to substantially the nearest outer perimeter point for establishing a varying transmittance threshold envelope across said thresholded light modulating element, which envelope is shaped in accordance with the signal dependent noise amplitude distribution across the face of the light modulating element, thereby to threshold out and thus attenuate a substantial portion of said additive signal dependent noise associated with the optical signal without substantially affecting the resolution of said optical signal; and (d) means for optically transforming the Fourier transform produced by the Fourier transform means of paragraph (b).

2. In a two-beam coupling apparatus for processing an optical signal that reduces additive signal dependent noise associated therewith without substantially affecting the resolution of the optical signal comprising:

(a) a spatially thresholded non-linear light modulating element;

(b) Fourier transform means for projecting a Fourier transform of both said optical signal and signal dependent noise upon the thresholded light modulating element;

(c) threshold control means having a substantially bell shaped transmittance over lines extending from substantially its center point to substantially the nearest outer perimeter point for establishing a varying transmittance threshold envelope across said thresholded light modulating element, which envelope is curved in accordance with the variable signal dependent noise amplitude distribution across the face of the light modulating element, to threshold out and thus attenuate a substantial portion of said additive signal dependent noise associated with the optical signal without substantially affecting the resolution of said optical signal; and (d) means for optically transforming the Fourier transform produced by the Fourier transform means of paragraph (b).

3. In a two-beam coupling apparatus for processing an optical signal that reduces additive signal dependent noise associated therewith without substantially affecting the resolution of the optical signal comprising:

(a) a spatially thresholded photo-refractive light modulating element;

(b) Fourier transform means for projecting a Fourier transform of a sum of the optical signal spectrum and signal dependent noise spectrum upon the thresholded non-linear light modulating element;

(c) threshold control means having a substantially bell shaped transmittance over lines extending from substantially its center point to substantially the nearest outer perimeter point for establishing a transmittance threshold envelope across said thresholded light modulating element which envelope is curved in accordance with the variable signal dependent noise amplitude distribution across the face of the light modulating element and positioned slightly above amplitude peaks of said noise, to threshold out and thus attenuate a substantial portion of said additive signal dependent noise associated with the optical signal processes without substantially affecting the resolution of said optical signal; and (d) means for optically transforming the Fourier transform produced by the Fourier transform means of paragraph (b).

4. The apparatus of claim 1 wherein said thresholded light modulating element comprises a spatial light modulator.

5. The apparatus of claim 1 wherein said thresholded light modulating element comprises a nonlinear optical element and means for projecting a coherent reference light beam thereon.

6. The apparatus of claim 1 wherein said thresholded light modulating element comprises a photorefractive crystal and means for projecting a coherent reference light beam thereon for forming a two beam coupling arrangement.

7. The apparatus of claim 5 wherein said threshold control means includes means for varying the intensity profile of said coherent reference light beam across the face of said nonlinear optical element.

8. The apparatus of claim 6 wherein said threshold control means includes means for varying the intensity profile of said reference carrier light beam across the face of said photorefractive crystal.

9. The apparatus of claim 7 wherein said means for varying includes a variable density filter.

10. The apparatus of claim 9 wherein said filter transmits light having high intensity to central portions of the nonlinear element and lower intensities to non-centralized portions of the nonlinear element.

11. The apparatus of claim 8 wherein said means for varying includes a variable density filter.

12. The apparatus of claim 11 wherein said filter transmits light having high intensity to central portions of the photorefractive element and lower intensities to non-centralized portions thereof.

13. The apparatus of claim 1 wherein said means for optically transforming includes Fourier transform means and inverse Fourier transform means, both consisting of a single lens positioned a focal length away from said thresholded light modulating element, thereby to eliminate the need for an additional Fourier transform lens.

14. The apparatus of claim 2 wherein said thresholded light modulating element comprises a spatial light modulator.

15. The apparatus of claim 2 wherein said thresholded light modulating element comprises a nonlinear optical element and means for projecting a coherent reference light beam thereon.

16. The apparatus of claim 2 wherein said thresholded light modulating element comprises a photorefractive crystal and means for projecting a coherent reference light beam thereon for forming a two beam coupling arrangement.

17. The apparatus of claim 15 wherein said threshold control means includes means for varying the intensity profile of said coherent reference light beam across the face of said nonlinear optical element.

18. The apparatus of claim 2 wherein said Fourier transform means and said inverse Fourier transform means both comprise a single lens positioned a focal length away from said thresholded light modulating element, thereby to eliminate the need for an additional Fourier transform lens.

19. The apparatus of claim 17 wherein said Fourier transform means and said inverse Fourier transform means both comprise a single lens positioned a focal length away from said thresholded light modulating element, thereby to eliminate the need for an additional Fourier transform lens.

* * * * *